UNITED STATES PATENT OFFICE.

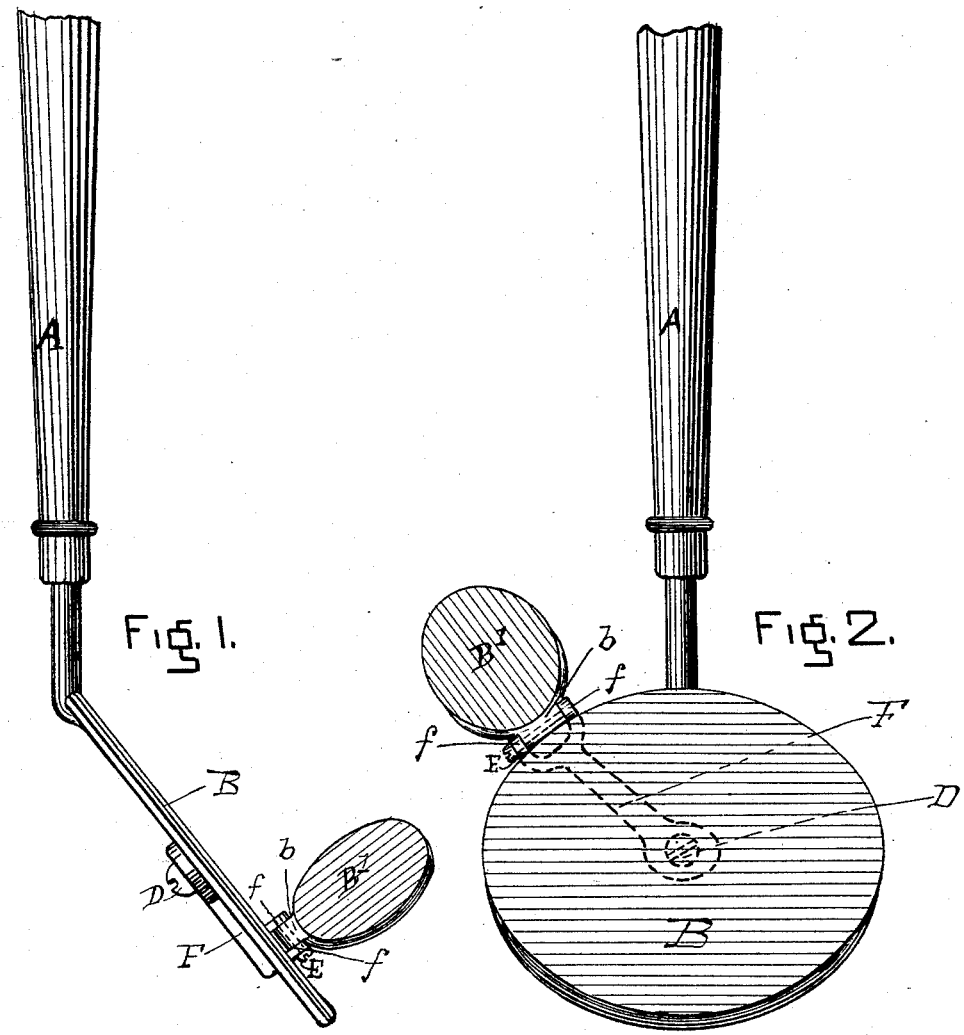

ALFRED EDDY GRAY, OF UXBRIDGE, MASSACHUSETTS.

DENTAL MOUTH-MIRROR.

SPECIFICATION forming part of Letters Patent No. 524,419, dated August 14, 1894.

Application filed June 1, 1894. Serial No. 513,187. (No model.)

*To all whom it may concern:*

Be it known that I, ALFRED EDDY GRAY, a citizen of the United States, residing at Uxbridge, in the county of Worcester and State of Massachusetts, have invented certain new and useful Improvements in Mouth-Glasses; and I do declare the following to be a full, clear, and exact description of the invention, such as will enable others skilled in the art to which it appertains to make and use the same, reference being had to the accompanying drawings, and to the letters of reference marked thereon, which form a part of this specification.

The present invention relates particularly to mouth-glasses, such as are used by dentists to assist in inspecting or treating the teeth and gums.

The invention consists in an improved construction of such a mouth-glass furnished with a second or auxiliary reflector to increase the efficiency of the instrument by reflecting additional light upon the portion of the mouth which is being examined, the auxiliary reflector being adjustable to any desired position to properly direct the rays of light.

The accompanying drawings show the improved mouth-glass on an enlarged scale, the handle of the instrument being only partially shown.

Figure 1, is an edge view, and Fig. 2, is a face view.

In the drawings, B is the main mirror which is of ordinary form and is fitted with the usual handle A. The mirror B, its handle A, and the connection between the same may be of any usual or desired construction.

B' is the auxiliary mirror or reflector, mounted at the side of mirror B adjacent thereto, said reflector B' being hinged or pivoted so as to be susceptible of adjustment to any desired inclination with respect to the main glass, and said reflector B' being also connected to mirror B in such manner as to be movable around to any desired position on the periphery thereof. The auxiliary reflector B' may be of any preferred construction, being however preferably smaller than mirror B.

The illustrated means for adjustably mounting the auxiliary reflector are as follows:—Reflector B' is hinged or pivoted at the outer end of a swinging arm F which swings around a central pivot stud D at the back of mirror B. The pivot D may be a rigid pin screwed into the back of the frame or case of mirror B at the center thereof, and the inner end of the radial arm F embraces said pivot so as to have a free swinging movement against the rear surface of the mirror B or its frame. At its outer end the arm F is forked and has a pair of separated journal lugs $ff$ which are located just outside the periphery of the mirror B, and which project at an angle from the arm so as to stand in the plane of or above the glass B (see Fig. 1). Between the lugs $ff$ of arm F is inserted the peripheral projection $b$ of reflector B', and the pivotal connection between the reflector and arm is completed by a pintle E which passes through said lugs $ff$ and projection $b$.

The lugs $ff$ not only support the pivoting pintle of reflector B' in a proper position relative to the face of mirror B, but also they rest against the periphery of mirror B and constitute a bearing for the outer end of arm F when it is revolved to change the position of the reflector. The pivoting pintle is held by the lugs $f$ a sufficient distance from the edge of mirror B so that there is always room for the reflector to turn freely on the hinge.

In order to maintain the reflector B' at any position and inclination to which it may be set, either the hinge and central pivot may be constructed so as to be held frictionally with sufficient firmness, or the pivot D and pintle E may be arranged to be screwed up to tighten the joints after the parts have been adjusted to the desired position and angle.

The mounting of the auxiliary reflector, it will be seen, is such that it can be moved to any point on the circumference of the mirror B and can be adjusted to any angle with no disconnection or substitution of parts. In this manner the instrument can be readily adjusted so as to best reflect and concentrate the light, and the auxiliary reflector when properly set will about double the effect of the glass.

It will be obvious that instead of mounting the hinged auxiliary reflector upon the revolving radial arm as described, there might readily be substituted some other form of traveling carrier, such as a rotatable ring encircling the mirror-frame, or a traveling section movable around an annular groove or track, which would permit said auxiliary reflector to be similarly moved around the periphery of the main glass. Any such equivalent construction would effect the same result in substantially the same way, and is of course included within the scope of the present invention.

I claim as my invention—

1. A mouth-glass comprising the mirror B carried by the handle of the instrument, and an auxiliary light-reflector hinged at the periphery of said mirror B and adapted to be set to any desired inclination with respect to said mirror B, substantially as set forth.

2. A mouth-glass comprising the mirror B, an auxiliary reflector at the side thereof hinged to permit its inclination to be adjusted, and a movable carrier carrying the hinge of said auxiliary reflector whereby said reflector can be shifted about the periphery of said mirror B, substantially as set forth.

3. A mouth-glass comprising a mirror B, a radial swinging arm at its back, and an auxiliary reflector carried by said radial arm and adapted to be moved thereby about the periphery of mirror B, substantially as set forth.

4. A mouth-glass comprising a mirror B, a radial swinging arm at its back, and an auxiliary reflector hinged at the outer end of said radial arm, substantially as set forth.

5. A mouth-glass comprising the mirror B, the radial swinging arm F at its back, lugs $f$ $f$ at the outer end of said arm projecting into the plane of mirror B and bearing against the periphery thereof, and the auxiliary reflector B′ hinged to said arm F by a pintle passing through said lugs substantially as set forth.

In testimony whereof I affix my signature in presence of two witnesses.

ALFRED EDDY GRAY.

Witnesses:
EDWARD J. PREST,
WILLIAM J. TAFT.